United States Patent [19]

Koba et al.

[11] Patent Number: 5,445,701
[45] Date of Patent: Aug. 29, 1995

[54] APPARATUS OF MANUFACTURING A SHEET-PREPREG REINFORCED WITH FIBERS

[75] Inventors: Tomohito Koba; Toshiyuki Nakakura, both of Yokohama; Hideo Sakai, Ebina; Satoru Kishi, Yokosuka; Chiaki Maruko, Kamakura, all of Japan

[73] Assignee: Research Association for New Technology Development of High Performance Polymer Tokyo, Japan

[21] Appl. No.: 268,718

[22] Filed: Jun. 30, 1994

Related U.S. Application Data

[60] Continuation of Ser. No. 13,435, Feb. 4, 1993, abandoned, which is a division of Ser. No. 841,204, Feb. 27, 1992, Pat. No. 5,201,979, which is a continuation of Ser. No. 535,153, Jun. 8, 1990, abandoned, which is a continuation of Ser. No. 189,955, May 3, 1988, abandoned.

[30] Foreign Application Priority Data

| | | | |
|---|---|---|---|
| May 8, 1987 | [JP] | Japan | 62-112045 |
| Aug. 24, 1987 | [JP] | Japan | 62-210610 |
| Aug. 28, 1987 | [JP] | Japan | 62-216251 |
| Aug. 28, 1987 | [JP] | Japan | 62-216253 |

[51] Int. Cl.⁶ ............. B29C 70/16; B29C 70/20; B29D 9/00; B29K 105/10
[52] U.S. Cl. ............. 156/441; 156/433; 156/500; 156/583.5; 425/371; 118/124; 118/118; 100/93 RP
[58] Field of Search ............. 156/161, 160, 166, 180, 156/164, 324, 322, 433, 583.5, 181, 500, 244.11, 441; 425/371; 427/366, 370; 118/124, 118; 264/136; 100/93 RP, 212

[56] References Cited

U.S. PATENT DOCUMENTS

| | | |
|---|---|---|
| 2,500,728 | 3/1950 | Williams . |
| 2,559,649 | 7/1951 | Little et al. . |
| 3,154,908 | 11/1964 | Cilker et al. . |
| 3,684,645 | 8/1972 | Temple et al. . |
| 3,686,048 | 8/1972 | Schirtzinger . |
| 3,844,822 | 10/1974 | Boss et al. .......... 118/59 X |
| 3,847,707 | 11/1974 | Meyer et al. . |
| 3,898,113 | 8/1975 | Meyer et al. . |
| 4,098,943 | 7/1978 | Degginger et al. . |
| 4,219,524 | 8/1980 | Miller . |
| 4,334,468 | 6/1982 | Guttinger et al. . |
| 4,335,176 | 6/1982 | Baumann . |
| 4,469,543 | 9/1984 | Segal et al. . |

(List continued on next page.)

FOREIGN PATENT DOCUMENTS

| | | |
|---|---|---|
| 1118642 | 6/1956 | France . |
| 1956038 | 5/1971 | Germany . |
| 1303588 | 3/1972 | Germany . |
| 2263324 | 7/1974 | Germany . |

(List continued on next page.)

*Primary Examiner*—Jeff H. Aftergut
*Attorney, Agent, or Firm*—Burns, Doane, Swecker & Mathis

[57] ABSTRACT

Method and apparatus for manufacturing a sheet-prepreg reinforced with fibers wherein a sheet of fibers such as warp or woven fibers such as fabrics is conveyed between a pair of band belts one of which is coated with a film of thermoplastic resin which has been heated higher than its softening point to enhance resin-impregnating efficiency and prevent the impregnated resin from contacting air. Further, when the sheet of fibers or woven fibers is conveyed in this manner, the molten resin is not maintained on the manufacturing line, thereby preventing it from being deteriorated by heat. The apparatus can be thus kept under operation for a long time and the sheet-prepreg reinforced with the fibers can be made much higher in quality and the deterioration of the impregnated resin can be further delayed.

17 Claims, 4 Drawing Sheets

U.S. PATENT DOCUMENTS

| | | |
|---|---|---|
| 4,543,145 | 9/1985 | Schnell et al. . |
| 4,559,262 | 12/1985 | Cogswell et al. . |
| 4,597,818 | 7/1986 | Aoyama et al. . |
| 4,622,192 | 11/1986 | Ma . |
| 4,659,425 | 4/1987 | Eggers et al. . |
| 4,670,080 | 6/1987 | Schwarz et al. . |
| 4,713,283 | 12/1987 | Cogswell et al. . |
| 4,720,366 | 1/1988 | Binnersley et al. . |
| 4,728,387 | 3/1988 | Hilakos . |
| 4,735,828 | 4/1988 | Cogswell et al. . |
| 4,743,187 | 5/1988 | Schermutzki . |
| 4,844,766 | 7/1989 | Held ............................. 156/583.5 X |
| 4,894,292 | 1/1990 | Dibuz et al. . |

FOREIGN PATENT DOCUMENTS

| | | |
|---|---|---|
| 45-35373 | 11/1970 | Japan . |
| 57-56220 | 4/1982 | Japan . |
| 60-165210 | 8/1985 | Japan . |
| 61-229534 | 10/1986 | Japan . |
| 61-229535 | 10/1986 | Japan ................................ 156/180 |
| 745628 | 2/1956 | United Kingdom . |
| 1434926 | 5/1976 | United Kingdom . |
| 1531435 | 11/1978 | United Kingdom . |
| 2088282 | 6/1982 | United Kingdom . |

Fig. 6
Fig. 8
Fig. 9
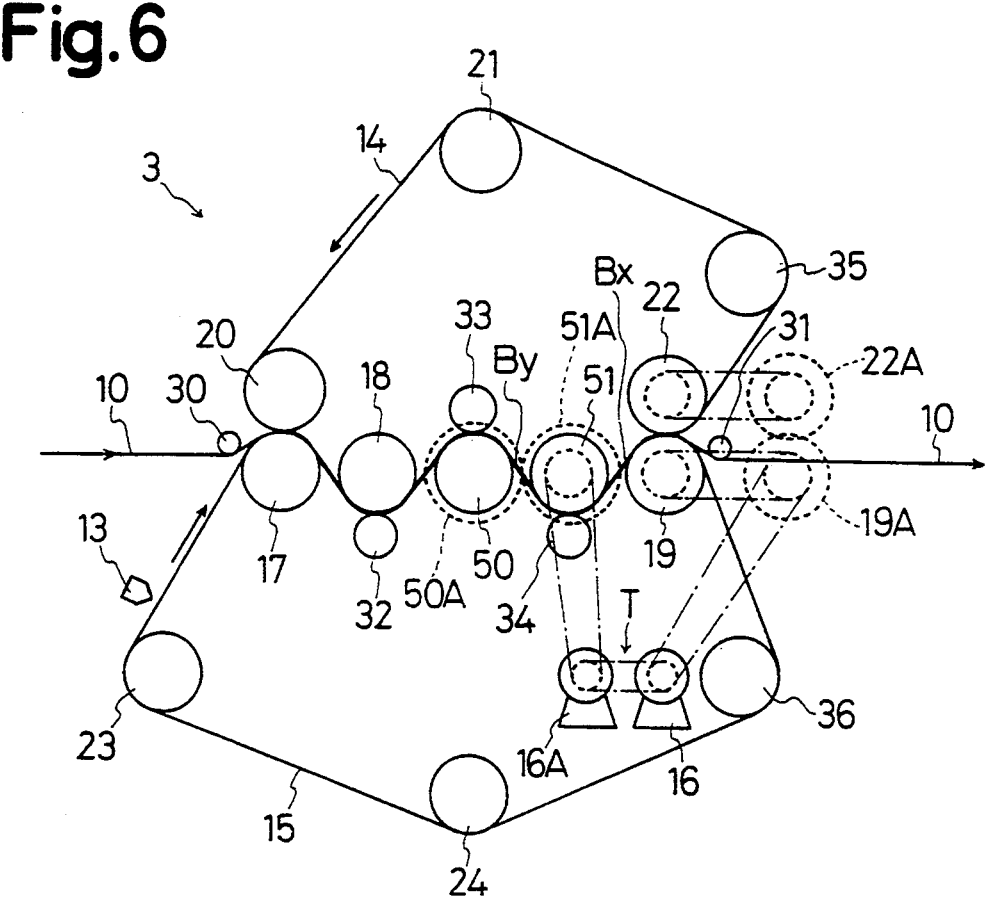
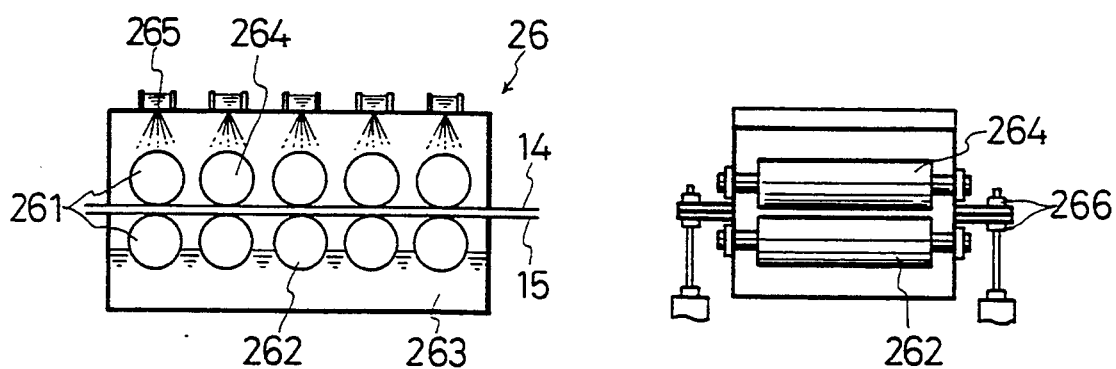

5,445,701

APPARATUS OF MANUFACTURING A SHEET-PREPREG REINFORCED WITH FIBERS

This application is a continuation of application Ser. No. 08/013,435, filed Feb. 4, 1993, now abandoned, which is a Div. of Ser. No. 07/841,204, filed Feb. 27, 1992 now U.S. Pat. No. 5,201,979, which is a cont. of Ser. No. 07/535,153, filed Jun. 8, 1990, now abandoned, which is a cont. of Ser. No. 07/189,955, filed May 3, 1988, now abandoned.

BACKGROUND OF THE INVENTION

1. Field of the Invention

The present invention relates to a method of manufacturing a sheet-prepreg reinforced with fibers and it also relates to an apparatus for the same. The sheet-prepreg of the present invention is used as one kind of industrial materials to form laminated products.

2. Description of the Prior Art

The conventionally-well-known method of impregnating fibers with thermoplastic resin to manufacture fiber-reinforced materials comprises introducing a sheet of fibers such as warp or woven fibers such as fabrics to a roller on which the thermoplastic resin has been coated, transferring the thermoplastic resin on the coating roller to the sheet of fibers or woven fibers, and then contacting the front or back side of the sheet of fibers or woven fibers with heating rollers to enhance resin-impregnating efficiency, as disclosed in preliminarily-opened Japanese Patent Applications Sho 61-229534, -228535 and -228536.

In the case of the apparatus for practicing the above-mentioned conventional method, no air shielding member such as a band belt is positioned on the back side of the fibers or woven fibers sheet which contacts the coating roller and the back side of the fibers or woven fibers sheet is thus left open to air.

The coating roller and a group of the heating rollers which is adjacent to the coating roller are placed separately each other. The resin just extruded is continuously supplied to the coating roller and coated onto the fibers or woven fibers sheet, thereby causing the resin to be transferred to the adjacent heating roller. The resin on the surface of the coating roller seems therefore to be slightly deteriorated but the amount transferred to the surface of the heating roller which is adjacent to the coating roller is extremely small because it is transferred only through the fibers or woven fibers sheet. The resin transferred thus stays on the surface of the heating roller without being transferred to the other heating rollers. Therefore, the resin transferred is not displaced by the one just extruded and maintained, hot and contacting air, on the heating roller. It is extremely difficult to completely remove the resin from the heating roller and the resin thus kept on the heating roller is deteriorated by heat and oxidation and crosslinked further and further as time goes by, thereby causing the apparatus to be rendered inoperative.

The resin impregnated into the fibers or woven fibers sheet has been deteriorated by heat and oxidation, as described above. Therefore, the sheet-prepreg thus obtained has insufficient strength and is poor in quality.

SUMMARY OF THE INVENTION

An object of the present invention is therefore to provide a method of manufacturing a sheet-prepreg reinforced with fibers, which is much higher in quality and whose resin is deteriorated only slightly, if at all.

Another object of the present invention is to provide an apparatus for practicing the method to enable the apparatus to be kept under stable and continuous operation for a much longer time.

These and other objects as well as its merits of the present invention will become apparent from the following description.

A main characteristic of the present invention resides in that a sheet of fibers such as warp or woven fibers such as fabrics is conveyed between a pair of band belts which have been heated higher than the softening point of a thermoplastic resin. The thermoplastic resin is coated as a film and travelled among the heating rollers and press-contacted with the surfaces of the heating rollers.

Each of the band belts is endless and even if the resin is transferred to a small extent to the surfaces of the band belts when the resin-impregnated fibers or woven fibers sheet is released from a resin-impregnating section and the resin thus transferred is then cooled and hardened, it is again heated and melted and mixed together with a large amount of the resin just extruded when the band belts return again to the inlet of the resin-impregnating section, thereby preventing the resin from being stayed between the belts.

Further, the resin is not deteriorated by heat and oxidation and it is also not gelatinized. In addition, the problem that the apparatus could not be operated for a long time in the case of the conventional roller coating can be solved, thereby enabling the apparatus to be kept under continuous operation for a much longer time.

As described above, the resin is not deteriorated by heat and oxidation, so that a sheet-prepreg reinforced with fibers and much higher in quality can be provided.

BRIEF DESCRIPTION OF THE DRAWINGS

FIG. 6 is a side view showing an improved example of the resin-impregnating section.

FIG. 8 is a sectional view showing a cooling device.

FIG. 9 is a side view showing the cooling device.

DETAILED DESCRIPTION OF THE PREFERRED EMBODIMENTS

Figure 1:
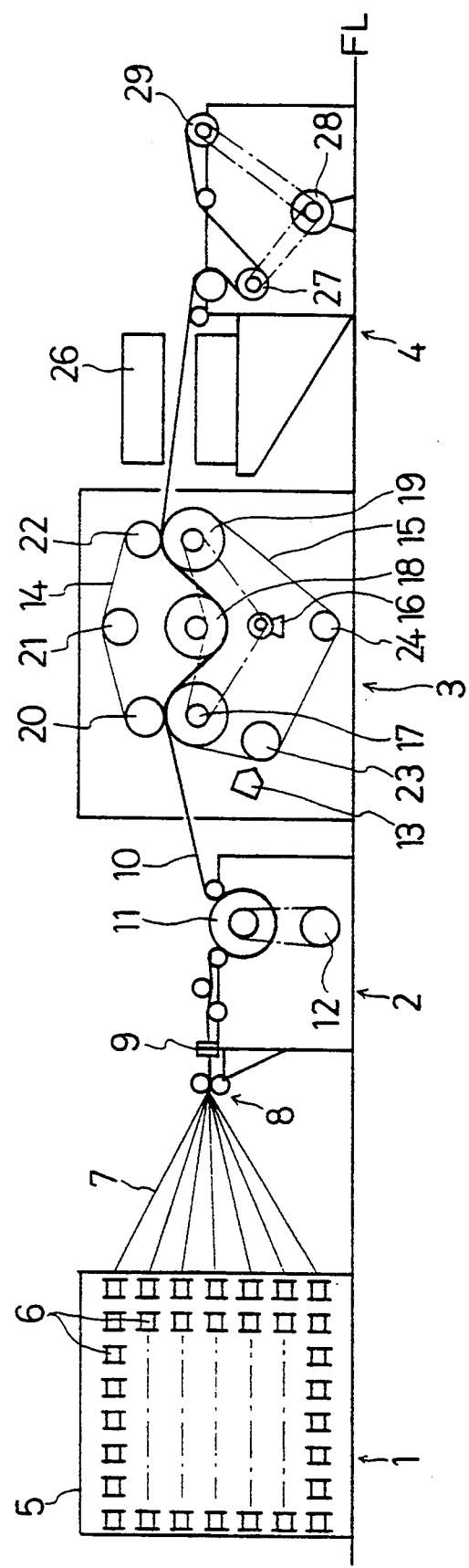
FIG. 1 is a side view showing an embodiment of the present invention.

Objects which are impregnated with a resin in the present invention include a sheet of fibers such as warp or woven fibers such as fabrics.

A plurality of continuous fibers in the present invention means a group of filaments, rovings, yarns or tows and the filament is so long and strong that it can be pulled contacting a film of molten thermoplastic resin on the manufacturing line. Glass fiber, carbon fiber and high modulus synthetic resin fiber is preferable for use in the present invention. Inorganic fiber such as silicon carbide fiber and alumina fiber, titanium fiber, boron fiber and metal fiber such as stainless steel can also be used.

The synthetic resin fiber is preferably surface-treated to have adhesiveness relative to the impregnating thermoplastic resin. It is further preferable that it does not change its strength and the like, depending upon the melting temperature of the thermoplastic resin used. Aramid fiber (registered trade name: "Kevlar"), for example, is cited as a synthetic resin fiber.

It is preferable that the glass and carbon fibers are coated on their fiber surfaces by a surface-treating agent such as the coupling agent of the silane or titanium system to enhance their adhesiveness relative to the thermoplastic resin used. For the purpose of preventing the roving and yarn from becoming loose, a sizing agent for bundling filaments can be used to such an extent that the use of this sizing agent does not disturb the impregnation of resin.

Plural continuous fibers are arranged side by side in a direction along the machine, spread not to cross one another, and adjusted to an appropriate thickness to form a sheet of fibers such as warp of a weaving machine. More specifically, the plural continuous fibers are wound round plural bobbins, respectively, fed with an appropriate tension from the bobbins, arranged side by side in an appropriate width and passed through a comb- or rake-like aligning means to form a sheet of fibers.

The thickness of this fibers sheet depends upon the filament diameter of a fiber (roving or tow), but it can be adjusted by the arrangement and areal weight of the rovings or tows in the width direction thereof. Thickness accuracy gives influence to the extent of impregnation and it is therefore preferably ±10% of a desired thickness. There is no limit to the thickness of the fibers sheet and when the thickness is made larger than 10 $\mu$m, the fibers cannot be broken while when it is made smaller than 1,000 $\mu$m, the amount of resin impregnated becomes large, voids are reduced and no forming faults are caused.

It is advantageous to raise the humidity at the working site to prevent the fibers from being broken by friction when they pass through guide rollers and the aligning means to form a sheet of fibers.

The sheet of fibers thus obtained is arranged to give a certain tension to its rovings or tows, and not to cross them one another.

The sheet of fibers may be formed by arranging a plurality of continuous fibers as in the case of examples which will be described later, but so-called beamed yarns which comprise a necessary number of fibers previously wound like warp round a warp beam in a direction can be used. The beamed yarns have been widely used as warp when the continuous fibers are woven to form a sheet of woven fibers such as a fabric or cloth. The sheet of woven fibers in the present invention includes those which comprise weaving the continuous fibers like a cloth, and it is optional how fibers are woven. Therefore, the sheet of woven fibers used in the present invention includes those which are formed according to the plain weave, twill weave and so on. Further, it also includes mat-like unwoven fibers, needle-punched mat-like unwoven fibers and the like.

The thermoplastic resin used in the present invention includes polystyrene, polyvinyl chloride, high density polyethylene, polypropylene, nylon, polycarbonate, polybutyleneterephthalate, Polyethyleneterephthalate and the like, but it is not limited to them.

In a case where the sheet-prepreg obtained according to the present invention is used as those materials which need structural strength, it is preferable that the fiber has a high modulus and a large tensile strength. Engineering resins of high grade such as polyethersulfone, polysulfone, polyphenylenesulfide, thermoplastic polyimide, polyetherimide (trade name: "ULTEM") and polyetheretherketone are most suitable for this purpose.

In the case of using these resins, it is preferable to previously dry them and it is more preferable that a coupling agent of the titanium system or the like is added to them to enhance their adhesiveness relative to fibers.

The thermoplastic resin is melted inside an extruder, extruded through a die attached to the foremost end of the extruder and then coated on the surface of a band belt, for example, which is previously heated. Resin temperature is determined depending upon the properties of various resins to form a uniformly-coated resin film. The width of this coated resin film may be equal to or larger than that of the fibers sheet and its thickness is adjusted to an appropriate value, corresponding to that of the fibers sheet. This thickness is a value experimentally determined responsive to a set value related to the resin content in the sheet prepreg finally obtained. It is preferably in a range of 10–1,000 $\mu$m and more preferably in a range of 20–200 $\mu$m. Thickness accuracy gives large influence to the resin content of the sheet prepreg in the width direction of the sheet. It is therefore preferably ±10% of a set thickness and more preferably ±5% thereof.

The thickness accuracy of the coated resin film can be enhanced according to any of the common coating methods.

The sheet of fibers is press-contacted with a roller through the lower band belt, for example, on which the resin has been coated as a film, thereby starting to impregnate the fibers with the resin. The impregnation of resin is finished when the coated resin film passes among those filaments which form the fibers sheet, and then reaches the back side of the fibers sheet. The contact pressure of the fibers sheet relative to the band belt and roller is sufficient so as to enable the fibers sheet to push through the coated resin film and reach the upper surface of the lower band belt. This contact pressure is adjusted by the tension applied to the fibers sheet. When this tension is too strong, the coated resin film is divided in the width direction of the fibers sheet without passing among the filaments of the sheet. The tension must be therefore determined depending upon the viscosity of the resin used.

The viscosity of the resin in the present invention is preferably in a range of 500–50,000 poise and more preferably 1,000–5,000 poise. The tension applied to the sheet of fibers (or woven fibers) in the present invention is preferably in a range of 1–10,000 g/fiber and more preferably 10–5,000 g/fiber. The tension applied to the sheet of woven fibers is preferably in a range of 5–100,000 g/cm width and more preferably 50–20,000 g/cm width.

The fibers sheet on which the resin has been coated is then conveyed under the condition that it is sandwiched between the upper and lower band belts, press- contacted with one or two or more heating rollers to enhance the impregnation efficiency, and then cooled and wound. The temperature of these heating rollers is set higher than the softening point of the resin to be impregnated.

The softening point in this specification means the lowest temperature which can be measured under a load of 5 kg by the melt index metering device.

The face of the fibers sheet which is contacted with the lower band belt the first time is assumed to be its front face, the back face thereof is then contacted with the first heating roller through the upper band belt and the front face thereof is then further contacted with the second heating roller through the lower band belt, and this is alternately repeated depending upon the number of the heating rollers used, thereby causing the resin on the front or back face of the fibers sheet to be moved alternately from the front face of the sheet to the back face thereof and then from the back face to the front face among the filaments of the sheet by means of the heating rollers used. When the sheet of fibers is conveyed like this, the impregnation of resin can be enhanced.

It must be determined according to the property of the resin used how many heating rollers are to be used and it is preferable to adjust the number of the heating rollers according to the kind of the resin used.

It is also preferable that the resin left on the surface of the band belt is removed by the doctor blade or the like because it is effective in adjusting the resin content in the sheet-prepreg and making the surface of the fibers sheet smooth. The resin can be removed under the molten or the hardened state but it must be determined according to the property of the resin under which state the resin is removed.

The extent of crystallization and the crystalline size are influenced by the cooling speed in the case of crystalline resins. It is therefore preferable to adjust the cooling speed according to the resin used and to control the extent of crystallization and crystalline size of the resin included in the sheet-prepreg. The resin-impregnated fibers sheet may be gradually cooled by a cooling section located between the resin-impregnating section and the winding machine and having a temperature gradient. Or It may be rapidly cooled, blowing a cooling medium such as the cooling air directly onto it.

In the case where the fibers sheet is released from the resin-impregnating section under the condition that its impregnated resin is molten, the resin is sometimes deteriorated upon contacting the air and the like at the cooling time, depending upon the kind of the resin. It is more preferable in this case to provide in the resin-impregnating section a cooling device which serves to cool the band belts to a temperature lower than the softening point of the thermoplastic resin.

The fibers sheet impregnated with the thermoplastic resin is then cooled lower than the softening point of the resin under the condition that it is sandwiched between the band belts, and wound by the winding machine.

The resin-impregnated fibers sheet may be gradually cooled in the atmosphere or forcedly cooled by jetting air or water to the upper and lower band belts. It is preferable from the viewpoint of enhancing the appearance of the resin-impregnated fibers sheet and removing bubbles or voids from the sheet that the upper and lower band belts are sandwiched between one or plural pairs of cooling nip rollers, for example, and that the fibers-sheet thus pressed between the upper and lower band belts is cooled by the nip rollers through the band belts. This also serves to facilitate the release of the fibers sheet from the band belts.

It is preferable from the viewpoint of enhancing the release of the fibers sheet from the band belts that release treatment is applied to the surfaces of the band belts.

The present invention will be described in detail with reference to its :typical embodiments shown in the drawings.

A case where the present invention is applied to a sheet of fibers will be described below at first.

As shown in FIG. 1, a manufacturing apparatus for carrying out a method of the present invention comprises a fibers feed section 1, a fibers supply section 2, a resin impregnating section 3 and winding section 4.

Fibers Feed Section

Figure 2:
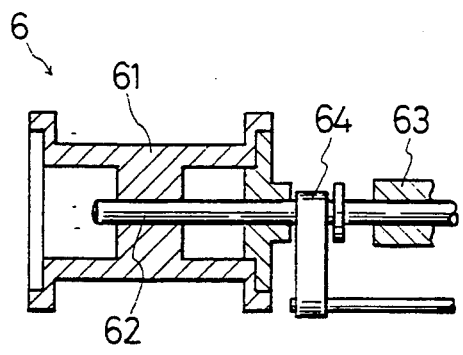
FIG. 2 is a sectional view showing how a bobbin round which a continuous fiber is wound is attached.

The fibers feed section 1 includes means or bobbins 6, for example, for feeding a plurality of continuous fibers and mechanisms or brake belts 64 show in FIG. 2, for example, for adjusting tension when the fibers are feeding.

The necessary number of continuous fibers 7 wound round a plurality of bobbins 6 on a creel 5 are fed from the fibers feed section 1. As shown in FIG. 2, the bobbin 6 includes a bobbin body 61, a shaft 62 to which the bobbin body 61 is fixed, and a bearing 63 to which the shaft 62 is rotatably attached. Attached to the shaft 62 is the brake belt 64 for adjusting the tension of the fiber fed from the bobbin 6.

Fibers Supply Section

Figure 3:
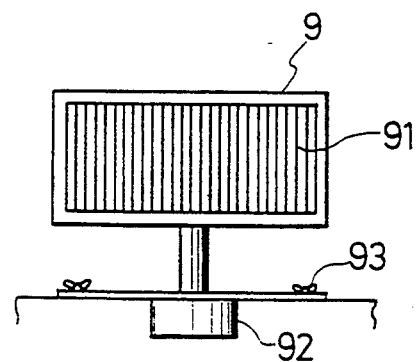
FIG. 3 is a front view showing an aligning means through which a plurality of fibers are aligned to form a sheet of fibers.
Figure 4:
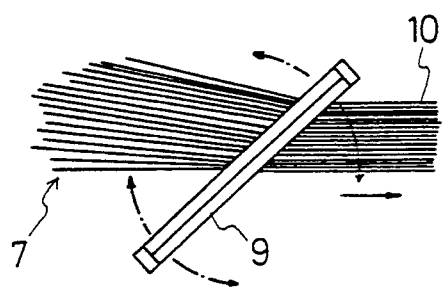
FIG. 4 is a plan view showing the aligning means (through which plural fibers are aligned to form half of the fibers sheet in this case).

The fibers supply section 2 serves to arrange the continuous fibers 7, which are fed from the bobbin bodies 61, side by side in the horizontal direction by means of guide rollers 8, and align them through an aligning means 9 to have an optional interval between the fibers and an optional width of the fibers so as to form a sheet of fibers 10. As shown in FIGS. 3 and 4, the aligning means 9 comprises stretching a plurality of steel lines 91 in a frame, and the continuous fibers 7 are aligned by passing between the steel lines 91 one by one. The aligning means 9 has a bearing 92, which enables the aligning means 9 to be swung in those directions shown by the arrows in FIG. 4. When the aligning means 9 is swung in this manner, the intervals between the continuous fibers 7 are adjusted so that the width and thickness of the fibers sheet 10 can be adjusted. Numeral 93 denotes setscrews for fixing the aligning means 9 after it is swung to an optional angle.

The fibers sheet 10 is then controlled by a tension adjusting roller 11 which has a brake 12 to have a uniform tension all over its width. It is preferable that the surface of the tension adjusting roller 11 be made of rubber or the like to achieve easy tension adjustment. There is no limit to how the fibers sheet 10 is tensioned but the fibers sheet 10 may be tensioned to such an extent that its fibers are not tangled in the course of resin impregnation at the resin impregnating section 3. The tension adjusting roller 11 may be omitted if uniform tension adjustment can be attained for all of the bobbins 6 at the fibers feed section 1.

Resin Impregnating Section

The resin impregnating section 3 has a pair of upper and lower band belts 14 and 15, and a first (or inlet) heating roller 17, a second heating roller 18 and a lower (or outlet) pull roller 19 that are arranged side by side from the inlet to the outlet along the fibers sheet conveying passage. A first nip roller 20 is located above the first heating roller 17 while an upper pull roller 22 is located above the lower pull roller 19. Numeral 21 represents a roller for adjusting the tension of the upper band belt, 23 a heated resin supply roller, 24 a roller for adjusting the tension of the lower band belt, 13 a die for supplying resin and 16 a drive motor.

The band belts are heated in such a way that the heat of the heated rollers 17, 18, 19, 20, 22 and 23 is transmitted to the band belts which are press-contacted with these rollers.

The thickness of the fibers sheet impregnated with resin can be adjusted by adjusting the interval between the outlet rollers 19 and 22.

It is preferable to provide scrapers or doctor blades (not shown) for scraping the resin film left on the surfaces of the upper and lower band belts 14 and 15. When the band belts are usually contacted with the resin and fibers sheet 10 through their clean surfaces, the amount of resin impregnated into the fibers sheet 10 can be kept unchanged.

When the fibers sheet 10 enters into the resin impregnating section 3 which has the above-described arrangement, it is contacted with the lower band belt 15 on which a thermoplastic resin which has been melted in an extruder which is employed to melt and supply the resin is coated as a film through a die 13 while it is press-contacted with the heating roller 17 through the lower band belt 15 so that it is impregnated with the resin, and it is press-contacted with the heating roller 18 through the upper band belt 14 and then with the lower pull roller (or heating roller) 19 through the lower belt 15. Resin impregnation is thus achieved sufficiently.

The resin impregnating section can be improved as shown in FIG. 6 to enhance resin impregnating at high speed. An example shown in FIG. 6 further includes third and fourth heating rollers 50 and 51 added to those at the resin impregnating section shown in FIG. 1.

An improvement resides in a first resin impregnation promoting roller 30 located near the inlet of the resin impregnating section 3.

It is preferable to set the roller 30 at such a position that enables the fibers sheet to be press-contacted with the first heating roller 17 more strongly. This position of the roller 30 can be determined by the viscosity of the resin used and the tensioning direction between the first and second heating rollers 17 and 18.

In the case of the example shown in FIG. 6, the roller 30 is positioned lower than the top of the first heating roller 17 and it is arranged so that tension downward to left in FIG. 6 is applied to the fibers sheet on the side of the roller 30 and that tension downward to right is applied to the fibers sheet on the side of the second heating roller 18.

Although the distance between the centers of the roller 30 and first heating roller 17 is not limited, it is preferable to position the roller 30 near the first heating roller 17 as shown in FIG. 6. In a case where the roller 30 is positioned at a longer distance from the first heating roller 17, another roller which cooperates with the roller 30 can be interposed between the roller 30 and first heating roller 17. It is preferable that the roller 30 is provided with a mechanism for approaching the roller 30 and separating it from the first heating roller 17.

The fibers sheet 10 is horizontally introduced into the resin impregnating section 3 but it is not limited to this. It may be held horizontal but rising upward or lowering downward just before the first heating roller 17 and plural guide rollers may be added to it in this case unless functional effects achieved by the present invention are damaged. In the case where it is introduced, rising upward, to the roller 17, its inclination can be sometimes the same or substantially the same as its inclination between the rollers 30 and 17 and the roller 30 cooperates sometimes in this case with the guide rollers added to it.

There is no limit to the diameter (or size) of the roller 30.

When the above-described roller 30 is provided, resin impregnation into the fibers sheet 10 can be promoted even under high speed conveyance of the sheet and air in the fibers can be removed at the first stage of resin impregnation, thereby enabling products of high quality to be manufactured.

Another improvement resides in a resin impregnation promoting roller 31 located near the outlet of the resin impregnating section 3.

The roller 31 is positioned lower than the top of the outlet (or lower pull) roller 19 and this is preferably such a position that enables the fibers sheet 10 to be press-contacted with the outlet roller 19. It is preferable that the roller 31 has a position adjusting mechanism for approaching the roller 31 to and separating it from the roller 19.

The roller 31 and outlet roller 19 may be positioned adjacent to each other and there is no limit to the distance between their centers, but it is preferable to position them near to each other. In a case where the roller 31 is positioned at a longer distance from the outlet roller 19, another roller which cooperates with the roller 31 can be interposed between the roller 31 and outlet roller 19.

The fibers sheet 10 is horizontally discharged from the resin impregnating section 3, but it is not limited to this and it may be discharged, rising upward or lowering downward, from the resin impregnating section 3, depending upon its winding position. Needless to say, plural guide rollers may be added to the sheet 10 unless functional effects achieved by the present invention are damaged.

In the case where the sheet 10 is discharged, lowering downward, from the outlet roller 19, the inclination of the sheet 10 discharged can be sometimes the same or substantially the same as that of the sheet 10 between the roller 31 and outlet roller 19 and the roller 31 cooperates sometimes in this case with the other guide rollers added to the sheet 10.

The shape and diameter of the roller 31 is not limited to the roller shown on Figures.

When the above-described roller 31 is provided, the amount of resin impregnated can be made uniform even under high speed conveyance of the sheet and no crack (or so-called split) is caused along the fibers of the sheet.

A further improvement resides in resin impregnation promoting rollers 32, 33 and 34 located adjacent to second, third and fourth heating rollers 18, 50 and 51 (which are called intermediate heating rollers), respectively.

The second and fourth heating rollers 18 and 51 are intended to apply upward tension to the fibers sheet and it is preferable to position the resin impregnation promoting rollers 32 and 34 just under the second and fourth heating rollers 18 and 51, respectively. Similarly, it is preferable to position the resin impregnation promoting roller 33 just over the third heating roller 50.

The resin impregnation promoting rollers 32, 33 and 34 have no limit regarding their diameter (or size) but it is preferable that they are made smaller than the heating rollers 18, 50 and 51. The rollers 32, 33 and 34 may not be positioned just under or over the rollers 18, 50 and 51 but they may be shifted a little forward or backward (or left or right).

When the above-described rollers 32, 33 and 34 are added, the impregnation of resin into the fibers sheet 10 can be made uniform even if the sheet is conveyed at high speed, and the thickness of products can be adjusted.

A still further improvement resides in rollers 35 and 36 located between the rollers 21 and 22 and between the rollers 19 and 24, respectively, to adjust the meandering run of the band belts.

The rollers 21 and 24 move up and down in FIG. 6 to adjust the tension of the band belts while the rollers 35 and 36 moves their one ends to left and right in FIG. 6 to adjust the meandering run of the band belt s.

Means for moving the rollers 35 and 36 to left and right are not limited but various kinds of moving mechanism, for example, may be used.

Although not shown, the rollers 35 and 36 may be positioned outside the band belts 14 and 15 to press the band belts from outside so as to adjust the meandering run of the band belts. It is preferable in this case that the rollers 35 and 36 are made of soft material such as aluminum. Or the rollers 35 and 36 may be located between the rollers 20 and 21 and between the rollers 23 and 24, respectively.

One, two or more rollers which can move in directions same as or different from those of the rollers 35 and 36 may be added in addition to the rollers 35 and 36.

It may be arranged so that only one end of each of the rollers 19, 22 or 17, 20 is moved to left and right to adjust the meandering run of the band belts.

When the rollers 35 and 36 are provided as described above, the meandering run of the band belts which is likely to be caused if only the tension rollers are provided can be prevented and resin impregnating capacity can be enhanced even under high speed conveyance.

A still further improvement in FIG. 6 resides in a tension adjusting means T for making the tension of a band belt portion $B_y$ before the roller 51 smaller than that of a band belt portion $B_x$ behind the roller 51 which precedes the outlet roller 19.

The tension adjusting means T comprises a drive motor 16 directly connected to the outlet roller 19, for example, and a transmission 16A directly connected to the roller 51 which precedes the roller 19. It is preferable to change the number of rotations of the roller 51 in such a manner of transmitting the drive force of the transmission 16A to the roller 51.

The transmission 16A may be of any type which can change its drive force continuously or by steps, and it may be of the automatic, semi-automatic or manual type. Transmission may be attained through belt, chain, gears or the like. The adjusting range of the transmission is not limited particularly, but it is preferably 10–95% of the number of rotations of the drive motor.

It is preferable in the present invention to adjust the transmission 16A in such a way that the rotation of the outlet roller 19 is made fast while the rotation of the preceding roller 51 is made slow.

The drive force can be transmitted to the upper and lower outlet (or pull) rollers 22 and 19 when a drive gear 19A is connected to the drive motor 16 and a gear 22A is connected to the drive gear 19A.

The third and fourth heating rollers 50 and 51 are engaged with gears 50A and 51A, respectively.

As the result of connecting the rollers to the drive source as described above, the rollers 50, 51, 19 and 22 serve to act as drive rollers while the rollers 17, 18, 20, 21, 23, 24, 32, 33, 34, 35 and 36 act as follower rollers.

It is possible to drive the rollers 35 and 36 a little faster than the upper and lower outlet rollers 19 and 22, and the above-mentioned meandering run adjusting function can be further enhanced in this case.

The above-described embodiment is characterized in that the tension of those band belt portions which are located before and behind the roller 51 can be changed by changing (or controlling) the rotation of the preceding roller 51 in relation to the outlet roller 19. This characteristic can prevent the resin from being deteriorated. It does not matter how fast the rollers 17 and 18 which precede the roller 51 are rotated.

When the drive source which has the speed reduction mechanism for changing the rotation of the preceding roller independently of the outlet roller as described above is provided, tension applied to each of the band belt portions between the rollers can be freely changed and when the tension of band belt is made larger and larger as the belts come from the inlet of the resin impregnating section to the outlet thereof, the band belts can be prevented from separating from each other and resin deterioration because of air exposure can be thus prevented.

Cooling Section

The fibers sheet 10 impregnated with a resin as described above is cooled lower than the softening point of the resin while passing through a cooling device 26 at the cooling section.

The cooling device 26 can be arranged to cool the fibers sheet 10 at such a speed that satisfies the resin used. It is preferable to create a temperature gradient in the cooling device by arranging the heater, hot and cool air from the inlet to the outlet of the cooling device.

Figure 7:
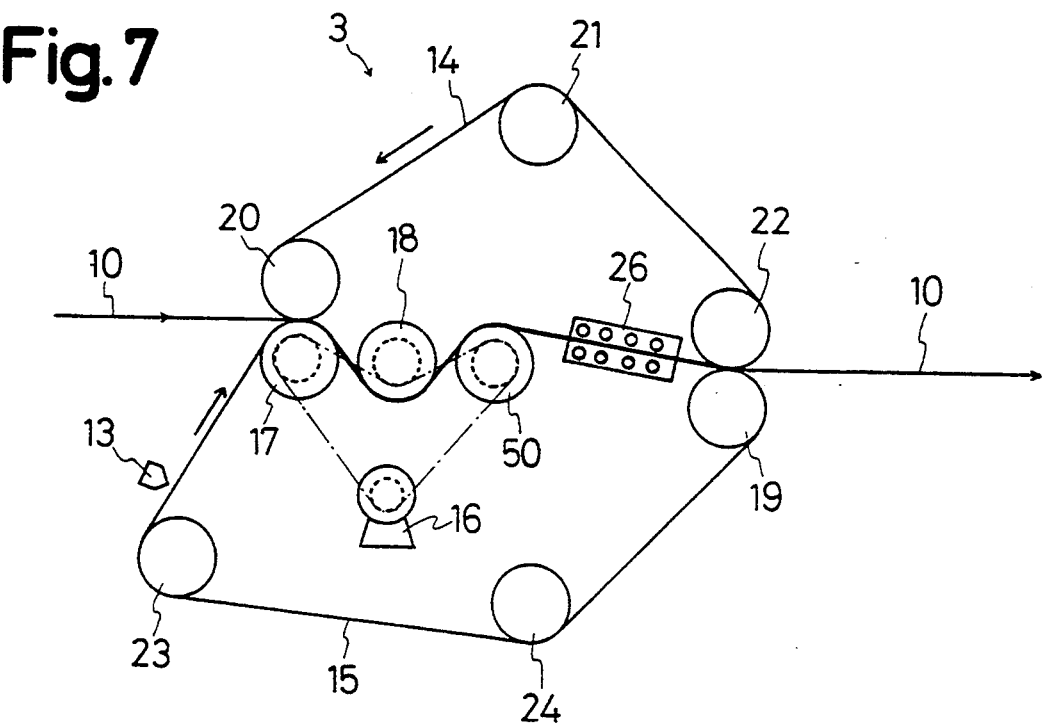
FIG. 7 is a side .view showing another example of the resin-impregnating section.

The cooling device 26 is a process following the resin impregnating section 3, as shown in FIG. 1, but it may be located in the resin impregnating section 3 as shown in FIG. 7.

The cooling device 26 shown in FIG. 7 includes one or plural pairs of rollers 261 and a group of the lower rollers 262 are cooled by water stored in a vessel 263, as shown in detail in FIG. 8. Another group of the upper rollers 264 are cooled by water sprayed through nozzles 265. It is preferable to attach a water holding material such as asbestos to the surface of these rollers because the cooling efficiency can be enhanced.

The upper and lower band belts 14 and 15 are cooled by the groups of these upper and lower cooled rollers 262 and 264 and the fibers sheet 10 is thus cooled. The nip force of the grouped upper and lower rollers 262 and 264 can be optionally adjusted, fastening bolts and nuts 266 shown in FIG. 9.

When cooling is carried out like this in the resin impregnating section, the fibers sheet can be shielded from air even at the cooling time and the deterioration of resin caused by oxidation can be thus prevented completely.

When the fibers sheet is cooled through the upper and lower band belts, there is no fear that the sheet of fibers or woven fibers is made dirty by the cooling medium. Therefore, water cooling and the like, low in cost, can be used.

Figure 10:
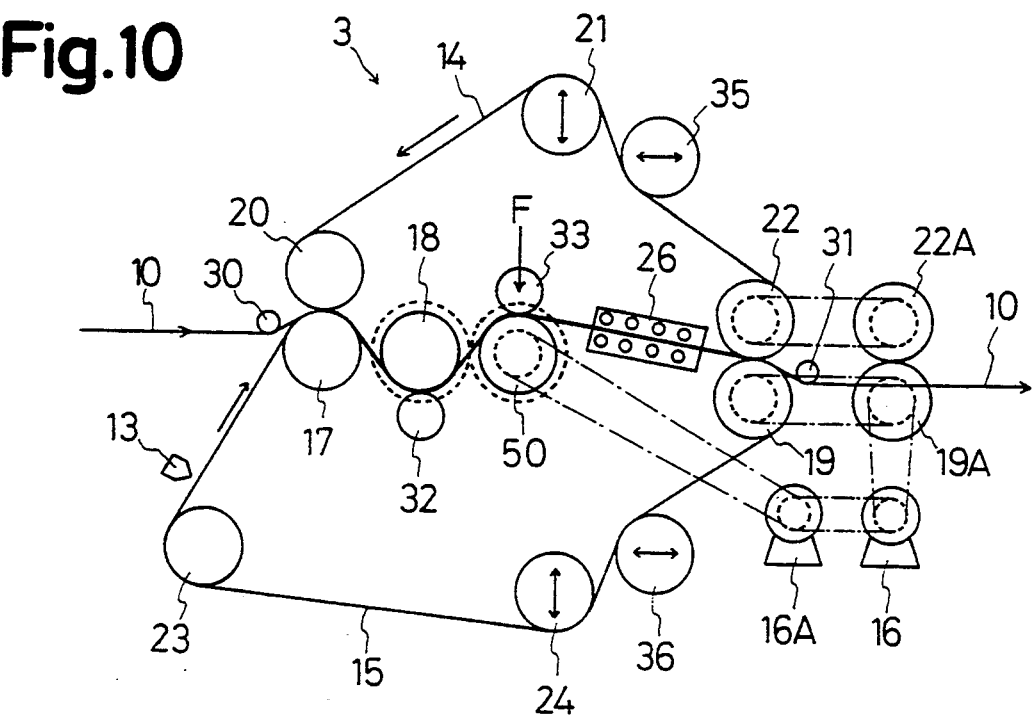
FIG. 10 is a side view showing a further example of the resin-impregnating section in detail.

When the embodiment shown in FIG. 7 is improved as shown in FIG. 10, high speed resin impregnation can be achieved similarly to the embodiment shown in FIG. 6.

Same parts as those shown in FIGS. 1 and 6 will be represented by same reference numerals in FIGS. 7 and 10 and description on these parts will be omitted.

The roller 50 is heated but the rollers 19 and 22 are not heated in the case of the improved embodiment shown in FIGS. 7 and 10. Because it is not preferable to heat the fibers sheet after the sheet is cooled.

Winding Section

The fibers sheet 10 thus cooled is pulled by a pull roller 27 at the winding section 4 while tensioning the sheet 10, and then wound round a winding shaft 29. Numeral 28 represents a motor for the pull roller 27 and winding shaft 29.

Although some embodiments of the present invention has been described, it should be understood that the present invention is not limited to them. For example, it may be arranged that a fibers sheet set section is used instead of the fibers feed section 1, that beamed yarns are set on the stand, and that a fibers sheet is supplied from the beamed yarns. The processes following this are similarly carried out as already described above. It is desirable in this case that the rotation of the beamed yarns is controlled to apply an appropriate tension to the fibers.

Figure 5:
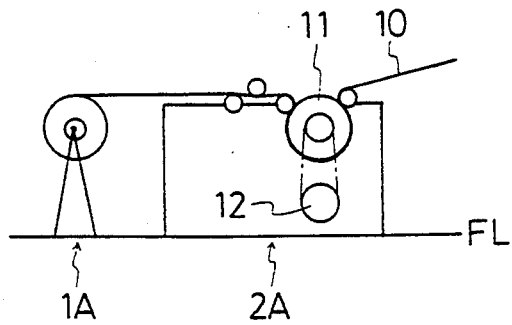
FIG. 5 is a side view showing a case where the present invention is applied to a sheet of woven fibers.

The above-described embodiments are intended to show the case where the present invention is applied to a sheet of fibers formed by a plurality of continuous fibers, but in a case where the present invention is applied to a sheet of woven fibers, a fibers-woven sheet set section 1A is arranged at the fibers feed section 1 shown in FIG. 5, the fibers-woven sheet is set at the set section 1A, supplied to the resin impregnating section 3 through a fibers-woven sheet supply section 2A and then impregnated with a resin in quite the same manner as in the abovedescribed embodiments.

Although resin supply has been conducted relative to the lower band belt 15 through the die 13, it may be done relative to the upper band belt 14. When roller arrangement and tensioning direction are made the reverse or upside down in this case round the conveying line of the fibers sheet 10, substantially same functional effects as in the above-described embodiments can be achieved.

Same parts as those in FIG. 1 are represented by same reference numerals in FIG. 5 and description on these parts are omitted accordingly. The resin impregnating section 3 and winding section 4 in FIG. 5 are same as those in FIG. 1 and they are not shown in FIG. 5 accordingly.

The present invention will be described referring to some examples.

EXAMPLE 1

Specifications of the apparatus shown in FIG. 1 were as follows. The number of bobbins was 100 units, the extruder was 30 mmØ, the width of rollers was 17–24 400 mm, the diameter of the rollers was 240 mm, the thickness of the upper and lower band belts was 0.5 mm and the width thereof was 350 mm.

Carbon fibers (Besfight HTA-7-3000) was used as the continuous fibers and polyether etherketone (VICTREX PEEK made by ICI Corporation) was used as the thermoplastic resin. The viscosity of this polyether etherketone was 7000 poise at 380° C. under a shear speed of 100 sec$^{-1}$.

The continuous fibers drawn from 100 units of bobbins were aligned to form a sheet of fibers, 15 cm wide. Polyether etherketone heated and melted at 380° C. in the extruder was coated on the lower band belt through a coat hanger die, said lower band belt running on the 400° C.-heated roller 23 at a speed of 50 cm/minute and said coated film being 60 μm thick. The fibers sheet to which tension of 150 kg was applied was sandwiched between the upper and lower band belts, passed between the rollers 17, 18, 19, 20 and 22 which were heated to 400° C., as shown in FIG. 1, to be impregnated with polyether etherketone, gradually cooled in the gradually-cooling furnace which was held 140° C., and then wound by the winding machine.

The apparatus was continuously operated over 24 hours and satisfactory operation was attained without causing the resin to be crosslinked because of heat and oxidation deterioration.

The sheet-prepreg thus obtained was 35 weight % in resin content and 0.13 mm thick. The fibers had no disorder and little voids occurred in the fibers. The retention of resin molecular weight held in the sheet-prepreg was measured to be 95%. The rate of resin molecular weight held denotes a relative molecular weight percent when the resin molecular weight before heating is 100.

Comparison Example

A sheet-prepreg was made using the apparatus and manufacturing conditions of example 1 disclosed in Preliminarily-opened Japanese Patent Application Sho 61-229535. The resin on the roller was gelatinized further and further because of heat and oxidation deterioration as time went by, and flow of the resin became difficult after about three hours. Impregnation became impossible and fiber filaments were broken, thereby causing the apparatus to be stopped.

The sheet-prepreg thus obtained was 36 weight % in resin content and 0.13 mm thick. No disorder was seen in the fibers and little voids were present in the fibers, but the retention of resin molecular weight held in the sheet-prepreg was 80%. This tells us that the resin deteriorated at the time of its impregnation.

EXAMPLES 2–4

The sheet-prepreg was obtained under the same conditions as in Example 1, but different kinds of resins were and operating conditions were shown in Table 1.

TABLE 1

| | Example 2 | Example 3 | Example 4 |
|---|---|---|---|
| Kinds of Thermo-Plastic resin | Polyether sulfone | Polycarbonate | Nylon 66 |
| Roll Temperature (°C.) | 350 | 300 | 280 |
| Tension*$^1$ (kg) | 150 | 120 | 100 |
| Thickness of Coated Resin Film (μm) | 60 | 60 | 75 |
| Temperature of Gradually-cooled Furnace (°C.) | 150 | 100 | 100 |
| Thickness of Sheet prepreg (mm) | 0.13 | 0.12 | 0.12 |
| Fiber Content (wt %) | 64 | 71 | 72 |
| Retention of Resin Molecular Weight | 95 | 94 | 90 |

TABLE 1-continued

|  | Example 2 | Example 3 | Example 4 |
|---|---|---|---|
| held*2 (%) | | | |

*1 Tension:
Values obtained from the relation between the longitudinal strain of band belts and Young's modulus. The Young's modulus of the band belt used was 18,500 kg/mm².
*2 Retention of resin molecular weight held: Relative molecular weight % when the molecular weight of resin before heating was assumed to be 100.

As is apparent from Table 1, it can be understood that an excellent sheet-prepreg can be obtained in the present invention whichever of the resins is used.

EXAMPLE 5

The apparatus shown in FIG. 5 had the following specifications. The extruder was 30 mm⌀, the width of the rollers 17–24 was 400 mm, their diameter was 240 mm⌀, the upper and lower band belts were 0.5 mm thick and 350 mm wide.

A sheet of plain Woven carbon fiber (Besfight W1103) was used as the continuous fibers and it was adjusted to have a width of 200 mm. Polyether etherketone similar to the one in Example 1 was used as the thermoplastic resin.

The cloth was set at the woven fibers sheet setting section 1A and tension of 30 kg was applied to the sheet in the pulling direction by the tension adjusting roller.

Polyether etherketone heated and melted at 380° C. in the extruder was coated, 60 μm thick, on the lower band belt through the coat hanger die, said lower band belt running on the 400° C.-heated roller 23 at a speed of 50 cm/minute. The tensioned woven fibers sheet 10 was held between the upper and lower band belts, passed between the rollers 17, 18, 19, 20 and 22 which were heated to 400° C. under same condition as shown in FIG. 5 to be impregnated with polyether etherketone, gradually cooled in the gradually cooling furnace which was held at 140° C., and then wound at the winding section.

The apparatus was continuously operated over 24 hours and satisfactory operation was attained without causing the resin to be gelatinized because of heat and oxidation deterioration.

The sheet of woven fibers thus impregnated with resin was 35 weight % in resin content and 0.13 mm in thickness. It had neither fiber distortion nor void in the fibers. The retention of resin molecular weight held in the sheet was measured to be 95%.

EXAMPLES 6–15

The arrangement shown in FIG. 6 was used at the resin impregnating section. Its specifications was as follows. The number of bobbins was 100 units, the extruder was 30 mm⌀, the width of the rollers 17, 18, 19, 20, 21, 22, 23, 24, 50 and 51 was 400 mm, their diameter was 240 mm⌀, the upper and lower band belts were 0.5 mm thick and 350 mm wide, but the rollers 30, 32, 33, 34, 35 and 36, impregnation promoting outlet roller 31 and speed reducer 16A were changed as shown in Table 2.

The impregnation promoting roller 30 was 400 mm wide and had a diameter of 100 mm⌀. The impregnation promoting rollers 32, 33 and 34 were 400 mm wide and had a diameter of 120 mm.

Numbers of rotation of the rollers 19 and 51 were set as shown in Table 2. A power clutch was used as the speed reducer 16A.

Carbon fibers were used as the continuous fibers and those shown in Table 2 were used as the thermoplastic resin.

The continuous fibers drawn from the bobbins of 100 units were aligned to form a sheet of fibers, 15 cm wide. Resin shown in Table 2 and melted in the extruder was coated on the lower band belt 15 through the coat hanger die, said band belt running on the roller 23 heated as shown in Table 2 at a speed of 75 cm/minute and said coated film having such thicknesses as shown in Table 2. The fibers sheet to which a tension of 150 kg was applied was held between the upper and lower band belts 14 and 15 and passed between the rollers 17, 18, 20, 50, 51, 19 and 22 which were heated as shown in Table 2 under the condition shown in FIG. 6 to be impregnated with the resin shown in Table 2.

The fibers sheet thus impregnated was gradually cooled in the cooling device which was held as shown in Table 2 and then wound by the winding machine.

The above process was continuously carried out over 24 hours and satisfactory operation was attained without causing the resin to be crosslinked because of heat and oxidation deterioration.

Test conditions and results were shown in Table 2. Symbol * means the following.

*3: In a case where the speed reducer 16A was not used, a motor for driving the rollers 17, 18, 50 and 51 was added independently of the drive motor 16.

*4 Void ratio: Values obtained from the specific gravity and fiber weight percentage of the sheet-prepreg.

TABLE 2-1

|  | Example 6 | Example 7 | Example 8 | Example 9 | Example 10 | Example 11 | Example 12 | Example 13 | Example 14 | Example 15 |
|---|---|---|---|---|---|---|---|---|---|---|
| Condition | | | | | | | | | | |
| Resin supply | | | | | | | | | | |
| Resin name | Polyether ether ketone | Polyether ether ketone | Poly ether sulfone | Polycarbonate | Nylon 66 | Polyether ether ketone | Polyether ether ketone | Polyether ether ketone | Polyether ether ketone | Polyether ether ketone |
| Temperature of roller 23 (°C.) | 400 | 400 | 350 | 300 | 280 | 400 | 400 | 400 | 400 | 400 |
| Thickness of coated film on lower band belt (μm) | 80 | 60 | 60 | 60 | 75 | 60 | 60 | 60 | 60 | 60 |
| Roller 30 | Used | Used | Used | Used | Used | Used | Not Used | Not Used | Not Used | Not Used |
| Rollers 32, 33 and 34 | Used | Used | Used | Used | Used | Not Used | Not Used | Used | Not Used | Not Used |
| Temperature of rollers 17, 18, 20, 50, 51, 19 and 22 (°C.) | 400 | 400 | 350 | 300 | 280 | 400 | 400 | 400 | 400 | 400 |
| Speed reducer 16A | Used | Used | Used | Used | Used | Not Used [3] | Not Used [3] | Not Used [3] | Not Used [3] | Used |

TABLE 2-1-continued

| | Example 6 | Example 7 | Example 8 | Example 9 | Example 10 | Example 11 | Example 12 | Example 13 | Example 14 | Example 15 |
|---|---|---|---|---|---|---|---|---|---|---|
| Number of rotation (rpm) | | | | | | | | | | |
| Roller 19 | 1.0 | 1.0 | 1.0 | 1.0 | 1.0 | 1.0 | 1.0 | 1.0 | 1.0 | 1.0 |
| Roller 51 | 0.9 | 0.9 | 0.9 | 0.9 | 0.9 | 1.0 | 1.0 | 1.0 | 1.0 | 0.9 |
| Tension (kg/cm$^2$) [1] | | | | | | | | | | |
| Band belt between rollers 19 and 51 | 350 | 350 | 350 | 350 | 350 | 300 | 300 | 300 | 300 | 350 |
| Band belt between rollers 19 and 50 | 250 | 250 | 250 | 250 | 250 | 300 | 300 | 300 | 300 | 250 |
| Roller 31 | Not Used | Used | Not Used | Not Used | Not Used | Not Used | Used | Not Used | Not Used | Not Used |
| Rollers 35 and 36 | Not Used | Used | Not Used | Not Used | Not Used | Not Used | Not Used | Not Used | Used | Not Used |
| Cooling temperature (°C.) (Temperature of upper and lower nip rollers) | 140 | 140 | 150 | 100 | 100 | 140 | 140 | 140 | 140 | 140 |
| Result | | | | | | | | | | |
| Oxidation deterioration of resin | Not Seen | Not Seen | Not Seen | Not Seen | Not Seen | Not Seen | Not Seen | Not Seen | Not Seen | Not Seen |
| Thickness of sheet-prepreg (mm) | 0.13 | 0.13 | 0.13 | 0.12 | 0.12 | 0.13 | 0.13 | 0.13 | 0.13 | 0.13 |
| Void ratio (%) [4] | 0.3 | 0.2 | 0.3 | 0.2 | 0.1 | 1.2 | 1.2 | 1.0 | 1.2 | 1.2 |
| Retention of resin molecular weight held (%) [2] | 98 | 98 | 98 | 96 | 94 | 97 | 95 | 95 | 97 | 97 |

EXAMPLE 16

The apparatus, whose fibers feed and supply sections 1 and 2 were changed as shown in FIG. 5, was used. The resin impregnating section had the same specifications as in the Example 6.

A sheet of plain woven carbon fibers (Besfight W-1103) whose width was adjusted to 200 mm was used as the continuous fibers. Polyether etherketone similar to that in the Example 6 was used as the thermoplastic resin.

The woven fibers sheet was set at the fibers feed section and tension of 30 kg was applied to it in the pulling direction by means of the tension adjusting roller. After it was impregnated under the same conditions as in the Example 6, it was gradually cooled in the gradually cooling furnace and a sheet-prepreg was thus obtained. The sheet-prepreg thus obtained was 0.13 mm thick and had a void ratio of 0.4% and the retention of resin molecular weight held in it was 98%.

EXAMPLE 17

The apparatus whose resin impregnating section and cooling device shown in FIG. 1 were changed as shown in FIG. 7 was used and same impregnating, cooling and winding as in the Example 1 were carried out.

The above process was continuously performed over 24 hours. No gelation of the resin because of heat and oxidation deterioration was seen and satisfactory operation was attained. The sheet thus obtained was 35 weight % in resin content and 0.13 mm thick. No fiber distortion was seen and little voids were present among the fibers. The retention of resin molecular weight held in the sheet-prepreg was 97%.

EXAMPLES 18–20

Sheet-prepreg was obtained under the same conditions as in the Example 17 but changing the kinds of resin and operating conditions as shown in Table 3.

TABLE 3

| | Example 18 | Example 19 | Example 20 |
|---|---|---|---|
| Kind of Thermoplastic Resin | Polyether-sulfone | Polycarbonate | Nylon 66 |
| Temperature of Heating Roller (°C.) | 350 | 300 | 280 |
| Tension*[1] (kg) | 150 | 120 | 100 |
| Film Thickness of Coated Resin (μm) | 60 | 60 | 75 |
| Temperature of Cooling Device*[5] (°C.) | 150 | 100 | 100 |
| Thickness of Sheet-prepreg (mm) | 0.13 | 0.12 | 0.12 |
| Fiber Content (wt %) | 64 | 71 | 72 |
| Retention of Resin Molecular Weight held (%) | 97 | 96 | 94 |

*[5]The temperature of the cooling device denotes the one of band belt measured at the outlet of the cooling device.

As apparent from Table 3, it can be understood that excellent sheet-prepreg having little deterioration are obtained whichever resin may be used.

EXAMPLE 21

The apparatus, whose fibers feed and supply sections 1 and 2 shown in FIG. 1 were changed as shown in FIG. 5, was used. Specifications of the resin impregnating section were the same as in the Example 17.

A sheet of plain woven carbon fibers (Besfight W-1103) whose width was adjusted to 200 mm was used as the continuous fibers. Polyether etherketone (the same as in the Example 17) was used as the thermoplastic resin.

The woven fibers sheet was set at the fibers feed section 1A and a tension of 30 kg was applied to it in the pulling direction by the tension adjusting roller. After it was impregnated with the resin under the same conditions as in the Example 17, it was gradually cooled in the gradually cooling furnace. A sheet-prepreg was thus obtained.

The sheet-prepreg thus obtained was 35 weight % in resin content and 0.13 mm thick. No distortion was seen in the fibers and little voids were present among the fibers. The retention of resin molecular weight held in the sheet-prepreg was 97%.

What is claimed is:

1. An apparatus for manufacturing a thermoplastic resin sheet-prepreg reinforced with fibers comprising means for feeding a sheet of fibers, a pair of facing band belts heated higher than a softening point of the thermoplastic resin and supported by inlet rollers, outlet rollers and intermediate rollers so that the pair of facing band belts defines a non-linear path, a resin-impregnating section comprising extruder means and die means for coating a film of the thermoplastic resin on at least one of the band belts, a first resin impregnating promoting roller adjacent an inlet roller, a second resin impregnating promoting roller positioned in confronting relation to an intermediate roller and in contact with one of the bed belts, a third resin impregnating promoting roller adjacent an outlet roller, means for adjusting a tension of the band belts, means for controlling meandering of the belts, means for adjusting the tension of the band belt passing over the roller next to an outlet roller, means for cooling the thermoplastic resin impregnated sheet and winding means for winding the thermoplastic resin impregnated sheet of fibers that has passed through the resin-impregnating section and between the band belts, the pair of facing band belts preventing the thermoplastic resin from adhering to the rollers and preventing deterioration and oxidation of the thermoplastic resin.

2. An apparatus according to claim 1, wherein said plurality of intermediate rollers includes at least three intermediate rollers, and including fourth and fifth resin impregnating promoting rollers each of which contacts one of the band belts and is positioned in confronting relation to one of the intermediate rollers.

3. An apparatus for impregnating fibers with a thermoplastic resin and manufacturing a sheet-prepreg reinforced with fibers comprising means for feeding a sheet of fibers, a pair of facing band belts defining a non-linear path and heated to a temperature higher than a softening point of the thermoplastic resin, said pair of band belts including an upper band belt and a lower band belt which are each supported by a plurality of supporting rollers that include inlet rollers, orelet rollers and intermediate rollers, a resin-impregnating section comprising extruder means and die means for coating only an upper face of the lower band belt with a film of the thermoplastic resin, and resin impregnation promoting rollers contacting the upper band belt or a lower face of the lower band belt so as to promote impregnation of the sheet with the thermoplastic resin, at least one of the resin impregnation promoting rollers being positioned in confronting relation to one of said intermediate rollers, the fiber sheet being pushed through the film of thermoplastic resin to contact the upper face of the lower band belt, means for applying tension to the sheet of fibers conveyed between the pair of band belts, and winding means for winding the thermoplastic resin-impregnated sheet of fiber that has passed through the resin-impregnating section and between the pair of facing band belts, the pair of facing band belts preventing the thermoplastic resin from adhering to the rollers and preventing deterioration and oxidation of the thermoplastic resin.

4. The apparatus of claim 3 wherein at least one of the belts is supported by an inlet heating roller which is located adjacent to a resin impregnation promoting roller that influence the sheet of fibers towards the inlet heating roller.

5. The apparatus of claim 3 wherein at least one of the belts is supported by an outlet heating roller which is located adjacent to a resin impregnation promoting roller that influences the sheet of fibers towards the outlet heating roller.

6. The apparatus of claim 3 wherein at least one of the band belts is supported by a plurality of intermediate heating rollers at least one of which is located adjacent to a resin impregnation promoting roller that influences the sheet of fibers towards the heating roller.

7. The apparatus of claim 3 wherein the apparatus further comprises means for adjusting tension of the band belts and means for controlling meandering of the band belts.

8. The apparatus of claim 3 wherein the apparatus further comprises a plurality of rollers including a last roller supporting the band belts and means for adjusting tension of the belt passing over the roller immediately preceding the last of the plurality of rollers.

9. An apparatus according to claim 3, including a plurality of resin impregnation promoting rollers which are each positioned in confronting relation to one of the intermediate rollers and in contact with one of the band belts.

10. An apparatus according to claim 3, including meandering control means for controlling meandering of the band belts, said band belts being supported by the meandering control means.

11. An apparatus for manufacturing a sheet-prepreg reinforced with fibers having means for feeding fibers, means for aligning fibers in a uniform direction to form a sheet of fibers, means for impregnating fibers with thermoplastic resin comprising a pair of facing upper and lower band belts defining a non-linear path and heated to a temperature higher than a softening point of the thermoplastic resin, extruder means and die means for feeding the thermoplastic resin on the surface of the lower band belt, wherein the apparatus further comprises means for applying tension to the sheet of fibers between the fiber aligning means and the thermoplastic resin impregnating means and the facing band belts forming the upper band belt and the lower band belt are passed through a plurality of heating rollers such that a first heating roller contacts a lower side of the lower belt, a second heating roller contacts an upper side of the upper belt, and a third heating roller contacts the lower side of the lower belt, a resin impregnating promoting roller positioned in confronting relation to at least One Of said heating rollers axed in contact with one of Said upper and lower band belts, the pair of facing band belts preventing the thermoplastic resin from adhering to the rollers and prevents deterioration and oxidation of the thermoplastic resin.

12. An apparatus according to claim 11, wherein said resin impregnating promoting roller is positioned in confronting relation to the first heating roller, and including additional resin impregnating promoting rollers each positioned in confronting relation to one of the second and third heating rollers and in contact with one of the upper and lower band belts.

13. An apparatus according to claim 12, wherein said one heating roller is the second heating roller.

14. An apparatus according to claim 11, and including means for producing a tension in a band belt portion located upstream of one of the heating rollers with respect to a direction of movement of the sheet of fibers that is smaller than the tension in a band belt portion located downstream of said one heating roller.

15. An apparatus according to claim 11, including meandering control means for controlling meandering of the upper and lower band belts, said upper and lower band belts being supported by said meandering control means.

16. An apparatus for impregnating fibers with a thermoplastic resin and manufacturing a sheet-prepreg reinforced with fibers comprising means for feeding a sheet of fibers which is formed by aligning a plurality of fibers in a warp direction, a plurality of heating rollers arranged horizontally and wherein a first heating roller and an outlet heating roller are each paired with a nip roller, and other heating rollers are positioned in confronting relation with resin impregnating promoting rollers, a pair of facing band belts passing through the heating rollers, said resin impregnating promoting rollers each contacting one of the band belts, said pair of facing band belts defining a non-linear path, being heated to a temperature higher than a softening point of the thermoplastic resin and including an upper band belt and a lower band belt, means for feeding the thermoplastic resin having the viscosity in the range of 500 to 50,000 Poise to a resin impregnating section comprising extruder means and die means by which thermoplastic resin is coated on an upper face of said lower band belt to a thickness in the range of 10 to 1000 microns, wherein the resin impregnating promoting rollers contact an upper face of the upper band belt or a lower face of the lower band belt so as to promote impregnation of the fiber sheet with the thermoplastic resin whereby the fiber sheet is pushed through the thermoplastic resin coated on the band belt, and means for applying tension of from about 1 g/cm to about 100,000 g/cm to the sheet of fibers conveyed between the pair of band belts, cooling means by which the sheet of fibers is cooled after passing through the pair of facing band belts, and winding means for winding the thermoplastic resin-impregnated sheet of fibers that has passed through the resin-impregnating section and between the band belts.

17. An apparatus according to claim 16, and including tension applying means connected to one of said other heating rollers for applying tension to a band belt portion located on one side of said heating roller that is different from the tension of a band belt portion located on an opposite side of the one heating roller.

* * * * *